June 2, 1925.
R. MESTARS
SAFETY HOOK
Original Filed Sept. 1, 1922
1,540,030
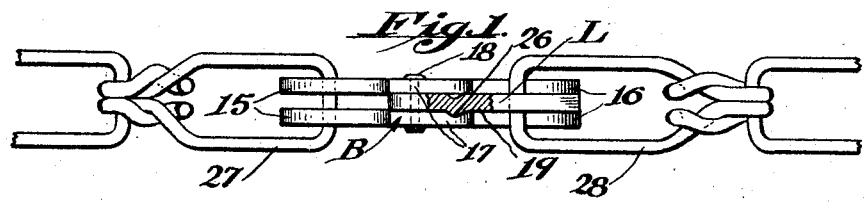
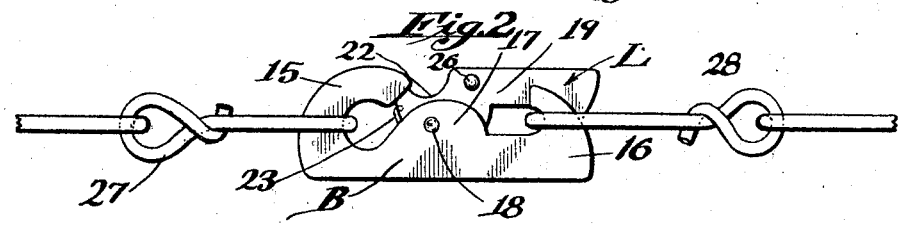
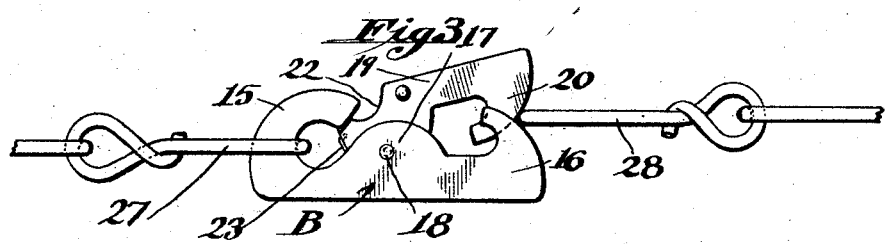
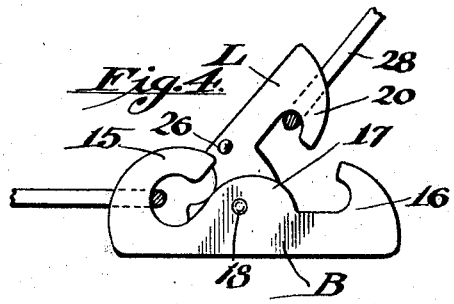
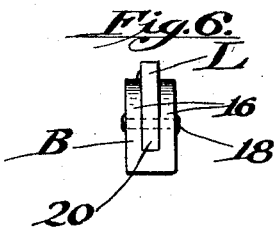
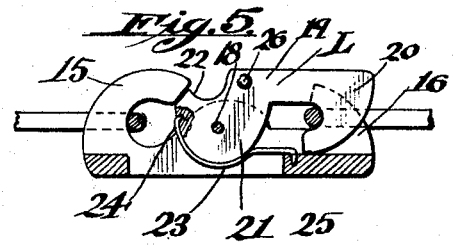
*Inventor.*
ROBERT MESTARS.
BY Hazard and Miller
*Attorneys*

Patented June 2, 1925.

1,540,030

UNITED STATES PATENT OFFICE.

ROBERT MESTARS, OF LOS ANGELES, CALIFORNIA, ASSIGNOR OF ONE-HALF TO CARRIE CONTRERAS, OF LOS ANGELES, CALIFORNIA.

SAFETY HOOK.

Application filed September 1, 1922, Serial No. 585,640. Renewed April 13, 1925.

*To all whom it may concern:*

Be it known that I, ROBERT MESTARS, a citizen of the United States, residing at Los Angeles, in the county of Los Angeles and State of California, have invented new and useful Improvements in Safety Hooks, of which the following is a specification.

My invention relates to snap hooks, and a purpose of my invention is the provision of a snap hook which operates to effect the connection of any two flexible or rigid elements in such manner as to prevent accidental disconnection of the elements while at the same time allowing of the ready intentional disconnection of the elements.

Although I have herein shown and described only one form of snap hook embodying my invention and will point out the novel features thereof in claims, it is to be understood that various changes and modifications may be made without departing from the spirit of the invention and the spirit and scope of the appended claims.

In the accompanying drawings,

Figure 1 is a view showing in top plan one form of snap hook embodying my invention in connecting position with respect to two lengths of chain;

Figure 2 is a view similar to Figure 1, showing the snap hook in side elevation;

Figure 3 is a view similar to Figure 2, showing one of the ends of one of the chains in opening position with respect to the closure lever of the snap hook;

Figure 4 is a view similar to Figure 3, showing the same chain end elevated and the manner in which it engages the lever to prevent displacement of the chain;

Figure 5 is a longitudinal sectional view of the snap hook shown in the preceding views;

Figure 6 is an end elevation of the snap hook shown in the preceding views.

Similar reference characters refer to similar parts in each of the several views.

Referring specifically to the drawings, my invention, in its present embodiment, comprises a body portion designated generally at B, which is formed from a single sheet of relatively heavy metal or other suitable material stamped or cast to provide terminal hooks 15 and 16 arranged at the four corners of the sheet. This sheet is bent longitudinally along the medial line and upon itself to dispose the hooks 15 and 16 in reversed relation to each other and in pairs, with the hooks of each pair disposed side by side but in spaced relation to each other. Intermediate the ends of the body B, the sheet is formed with ears or projections 17 which, in the bent position of the sheet, are disposed one beside the other but in spaced relation to each other. Extending through these ears or projections 17 is a pivot pin 18, and pivotally mounted upon this pin between the ears is a closure lever designated generally at L.

The lever L is of such a width as to work freely between the side portions of the body B, and this lever is shown as composed of an intermediate portion 19 at one end of which is formed a hook portion 20, while at the opposite end a curved portion 21 is formed and in depending relation to the intermediate portion 19. This curved portion 21 is constructed to provide a hooked portion 22 which is adapted to coact with the hooks 15 in confining a link or other element within the hooks 15. The bill of the hook 20 is reversely disposed with respect to the bills of the hooks 16 so that in the normal position of the lever, the hook 20 is disposed between the hooks 16 and in registering position with respect to the latter to confine a link or other element between the lever and body.

The lever L is normally urged to the position shown in Figures 2 and 5 by means of a leaf spring 23 which, as clearly shown in Figure 5, is curved to lie contiguous to the periphery of the curved portion 21, with one end bent as indicated at 24 to engage within a suitable recess in the curved portion. The opposite end of the spring is bent as indicated at 25 so as to engage within a suitable recess formed in the body between the side portions thereof. For the purpose of limiting the upward or outward movement of the lever L a projection 26 is formed on the lever so as to engage the bill of one of the hooks 15 when the lever is elevated. The arrangement of the projection 26 is such that with the lever in elevated position the hook 22 still serves to close the space between the hooks 15 and the ears 17 to prevent removal of the link engaging the hooks 15.

In practice, the snap hook is adapted to be employed in any capacity depending upon the particular size of the snap hook;

as, for instance, it may be employed in connecting the ends of a non-skid chain, or a swivel hook and watch chain, it being understood that I do not wish to be limited to any particular use of the snap hook. In the present disclosure, I have shown the snap hook as connecting the ends of a non-skid chain, one end being indicated at 27 and the other end at 28. In the application of the link 27 to the snap hook to engage the hooks 15, it is only necessary to force the link downwardly against the hook 22, thereby swinging the lever L upwardly against the tension of the spring 23, so as to cause the hook 22 to move downwardly until the link passes into engagement with the hooks 15. As soon as the link has disengaged the hook 22, it will be clear that the spring 23 operates to return the lever to the normal position shown in Figure 2.

To apply the link 28, the link is placed at the junction of the hooks 16 and 20, as shown in Figure 3, and by forcing the link forwardly in the direction of the hooks it will be clear that by virtue of the curved surfaces of the hooks the lever will be elevated until the link slips between the hooks and into engagement with the bills of the hooks 16, when the spring operates to return the lever to normal position, thereby causing the hook 20 to cooperate with the hooks 16 in preventing displacement of the link from the snap hook. Should the link 28 be elevated with respect to the snap hook, as illustrated in Figure 4, it will be manifest that the link will not become disengaged from the snap hook but will maintain an engagement with the hook 20, thus preventing disconnection of the snap hook from the link. The hooks 16 and 20 cooperate to provide what may be termed a permanent connection, in that after a link has been once applied it should remain in such applied position. The hooks 15, however, provide a temporary connection for a link or other element, because the disengagement of the link from the hooks is comparatively easy. In order to disengage the link 27 from the hooks 15, it is only necessary to elevate the lever to a position in which the hook 22 is spaced from the ends of the hooks 15 sufficiently to allow the passage of the link when the latter may be removed from the hooks.

I claim as my invention:

1. A snap hook comprising a body having hooks formed thereon, and a lever pivotally associated with the body and having hooks formed thereon, the arrangement of the hooks of the body and lever being such that an element can be applied to engage certain of the hooks by moving the element transversely of the body, while another element can be applied to engage the remaining hooks by moving the element longitudinally of the body.

2. A snap hook comprising a body having reversely disposed hooks formed thereon, extensions on the body between the hooks, a lever pivoted on the body between the extensions and including a hook at one end of the lever adapted to cooperate with one of the body hooks to form a closed loop, and a hook on the other end of the lever adapted to cooperate with the other body hook to form a closed loop, means for normally urging the lever to a position in which its hooks cooperate with the body hooks, and a stop formed on the lever and adapted to engage one of the body hooks for limiting the outward swinging movement of the lever.

3. A snap hook comprising a body, a lever pivoted on the body to occupy two extreme positions and an intermediate position, hooks formed on the body and lever, means for normally urging the lever to one extreme position in which the hooks of the lever cooperate with the hooks of the body to form closed loops, and a stop for defining the other extreme position of the lever in which an element is maintained in engagement with one of the lever hooks while the other lever hook is maintained in loop formation with respect to the corresponding body hook, and the lever in the intermediate position being so arranged that the second mentioned lever hook permits withdrawal of an element from the loop formed by said hook and the corresponding body hook.

4. A snap hook comprising a body formed with hooks which are reversely disposed, and a lever pivotally sustained on the body between the hooks and having hooks cooperating with the body hooks to form closed loops, the hooks on the lever extending from the same edge of the lever and in the same direction.

5. A snap hook comprising a body formed with hooks which are reversely disposed, and a lever pivotally sustained on the body between the hooks and having hooks cooperating with the body hooks to form closed loops, the hooks on the lever extending from the same edge of the lever and in the same direction, and means for positively urging the lever to a position in which the hooks thereof cooperate with the body hooks.

In testimony whereof I have signed my name to this specification.

ROBT. MESTARS.